United States Patent [19]

Kaainoa et al.

[11] 4,423,461
[45] Dec. 27, 1983

[54] POWER SUPPLY FOR CORONA DISCHARGE TREATMENT SYSTEM

[75] Inventors: Stephen H. Kaainoa, Menomonee Falls; Kenneth G. Kafer, West Allis, both of Wis.

[73] Assignee: Enercon Industries Corporation, Menomonee Falls, Wis.

[21] Appl. No.: 307,620

[22] Filed: Oct. 1, 1981

[51] Int. Cl.³ .......................................... H01T 19/00
[52] U.S. Cl. .................................... 361/235; 363/36; 363/37
[58] Field of Search ..................... 363/34, 79, 37, 49; 361/235

[56] References Cited

U.S. PATENT DOCUMENTS

| | | | |
|---|---|---|---|
| 3,376,493 | 4/1968 | Carlson | 363/49 |
| 3,406,327 | 10/1968 | Mapham et al. | 363/135 |
| 3,470,449 | 9/1969 | Risberg | 363/135 |
| 3,496,092 | 2/1970 | Fraser | 363/34 |
| 3,716,754 | 2/1973 | Weber et al. | 361/235 |
| 3,729,672 | 4/1973 | Rosenthal et al. | 363/37 |
| 3,736,493 | 5/1973 | Rosenthal et al. | 363/37 |

OTHER PUBLICATIONS

"Basic Parameters for Corona Treating" published by Softal of America Inc.

Primary Examiner—William H. Beha, Jr.
Attorney, Agent, or Firm—Quarles & Brady

[57] ABSTRACT

A power supply system generates a.c. power which is applied through a high voltage transformer to the electrodes of a treater. It includes a converter circuit which transforms a.c. electric power to d.c. power and an inverter which transforms the d.c. power to a.c. power. A feedback circuit senses the power delivered to the treater and separate control of both inverter frequency and output voltage is employed to prevent arc-over during the treatment process. The power supply system is particularly responsive to sudden changes in the operating conditions, and this enables treatment of relatively thin materials on a bare metal roller.

4 Claims, 6 Drawing Figures

POWER SUPPLY FOR CORONA DISCHARGE TREATMENT SYSTEM

BACKGROUND OF THE INVENTION

The field of the invention is apparatus for treating polymer film materials by exposing the surface of the film to a high voltage gaseous discharge having corona characteristics.

The treatment of both conductive and non-conductive materials to enhance their adhesion with printing inks is a well-established process. A sheet, or web, of a polymer material to be treated, for example, is conveyed over a metal roller which forms one electrode of the treatment apparatus. The other electrode is spaced from the metal roller and a high voltage alternating current is applied across the electrodes. The corona discharge in the air gap between the electrode bombards the surface of the polymer material with electrons and ions to physically and chemically change its surface as it moves over the metal roller. The amount of treatment may be varied and is dependent on the degree of the adhesion problem presented by the selected polymers and inks. Apparatus for carrying out this treatment process is described in U.S. Pat. Nos. 3,133,193; 3,507,763; 3,662,169; 3,708,733; 3,817,701; 3,900,538; 3,973,132 and 4,051,044.

When the material being treated is relatively thin, special precautions must be taken to prevent arc-over from occurring during the treatment process. Such arching burns holes through the treated material and draws excessive currents which trip the power supply circuit breakers. Although arc-over can be prevented by reducing the applied voltage, this also reduces the degree of surface treatment and is unsatisfactory in most instances. Instead, the solution to this problem has been to coat the metal roller with a layer of insulating material having a high dielectric constant. Although this is an effective solution which has been employed for more than a decade, the dielectric layer adds considerable expense and requires periodic replacement. There is a need for an apparatus which effectively treats thin polymer materials without the need for a dielectric layer on the metal roller.

SUMMARY OF THE INVENTION

The present invention relates to a power supply system for providing a.c. electric power to an apparatus which treats the surface of thin insulating materials by a corona discharge process, and particularly, to a power supply system which will enable such treatment to occur without the necessity of an additional layer of insulating material. The power supply includes: a converter which connects to receive a.c. power and which operates to generate d.c. power at a controllable level; an inverter which connects to receive the d.c. power and which operates to convert it to a.c. power at a controllable frequency for application to the treatment apparatus; and a feedback circuit which is connected to sense the a.c. power delivered to the treatment process and which operates to generate a power command signal which changes the frequency of the a.c. power applied to the treatment apparatus when the power demanded by the treatment process increases. The invention further provides a buffer connected between the inverter and the treatment apparatus which inhibits the response of the inverter to sudden changes in operating conditions until the feedback circuit and the converter circuit adjust to the changed operating conditions.

It has been discovered that during start-up of the treatment apparatus it is desirable to apply relatively high frequency a.c. power until ionization of the air gap between the electrodes occurs. The higher frequency (for example 8 KHz to 10 KHz) enables lower voltages to be applied during start-up, and this reduces the possibility of arc-over. However, after ionization the situation is quite different. It has been discovered that a much "smoother" corona is produced and the possibility of arc-over is reduced if the frequency of the applied a.c. power is substantially reduced (for example 4 KHz to 6 KHz). In the preferred embodiment of the invention this change in operating conditions is determined by sensing treatment power and providing a power command feedback signal which reduces the inverter frequency when ionization occurs.

A general object of the invention is to enable thin polymer materials to be treated using a bare metalic roller as one of the electrodes. This is accomplished by carefully controlling the frequency and level of the a.c. power applied to the treater electrodes, particularly when the load impedance drops rapidly during ionization of the air gap between the electrodes. The power supply system is highly responsive to changes in operating conditions, and in addition, the buffer prevents the delivery of a power surge to the air gap before the power supply system is able to adapt to the lower load impedance.

The foregoing and other objects and advantages of the invention will appear from the following description. In the description, reference is made to the accompanying drawings which form a part hereof, and in which there is shown by way of illustration a preferred embodiment of the invention. Such embodiment does not necessarily represent the full scope of the invention, however, and reference is made therefore to the claims herein for interpreting the scope of the invention.

DESCRIPTION OF THE PREFERRED EMBODIMENT

Figure 1:
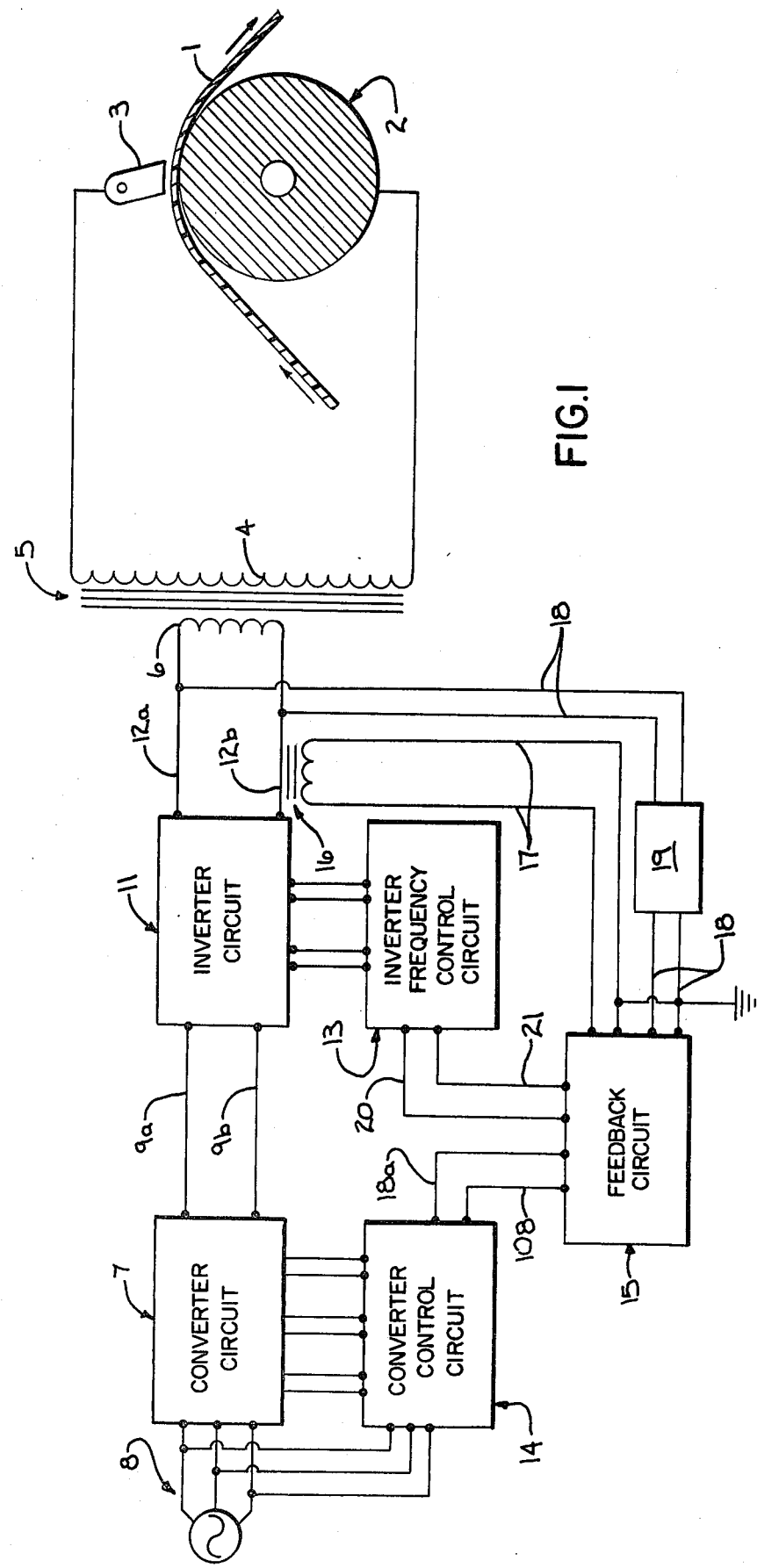
FIG. 1 is a block diagram of the power supply system and a schematic representation of the treatment apparatus with which it is used.

Referring particularly to FIG. 1, a thin web of polymer material 1 is conveyed over a metal roller 2 and its top surface is treated by a high voltage gaseous discharge from a metal electrode 3. The electrode 3 forms part of an electrical circuit which includes the secondary winding 4 of a high voltage transformer 5 and the metal roller 2 which serves as a second electrode. An alternating current is induced in this circuit by the high voltage transformer 5, and the amount of treatment to the surface of the web 1 is determined by controlling the applied electric power. The frequency of this electric power can also be varied to accommodate different operating conditions.

A primary winding 6 on the high voltage transformer 5 is driven by a power supply system which precisely controls the amount of power applied to the secondary circuit, and hence, the amount of power delivered to the air gap between the electrode 3 and the surface of the web material 1. This power supply system includes a converter circuit 7 which receives three phase a.c. line voltage from conventional power lines 8 and converts it to a d.c. voltage on a d.c. bus 9a and 9b. An inverter circuit 11 connects to the d.c. bus 9 and it converts the d.c. voltage to an a.c. voltage which is applied through lines 12a and 12b to the primary winding 6 of the high voltage transformer 5. The frequency of this generated a.c. voltage is determined by an inverter frequency control circuit 13 which drives the inverter circuit 11. The amplitude of this a.c. output voltage is controlled by the converter circuit 7, which in turn is controlled by a converter control circuit 14. The frequency and amplitude of the a.c. output voltage applied to the high voltage transformer 5 may thus be independently controlled by the power supply system.

The power supply system also includes a feedback circuit 15 which provides control signals to the converter control circuit 14 and the inverter control circuit 13. The feedback circuit 15 connects to a current transformer 16 through lines 17. The current transformer 16 couples to the output line 12b and it provides a feedback voltage on lines 17 which is proportional to the current delivered to the high voltage transformer 5. Lines 18 provide a voltage feedback signal to the feedback circuit which is reduced in magnitude by a transformer 19, but which is proportional to the voltage applied to the high voltage transformer 5. As will be described in more detail below, the feedback circuit 15 provides a command signal through line 20 which controls the frequency of the output voltage of the inverter circuit 11 and it provides a current limit signal through a line 21 which inhibits the operation of the inverter circuit 11 when excessive current is delivered to the high voltage transformer 5. In addition, the feedback circuit 15 supplies voltage control signals to the converter control circuit 14 through lines 18A and 108. The signals provided by the feedback circuit 15 reduce the frequency of the inverter circuit 11 when power demand increases, and they insure that a desired treatment power and voltage is maintained under all operating conditions.

Figure 2:
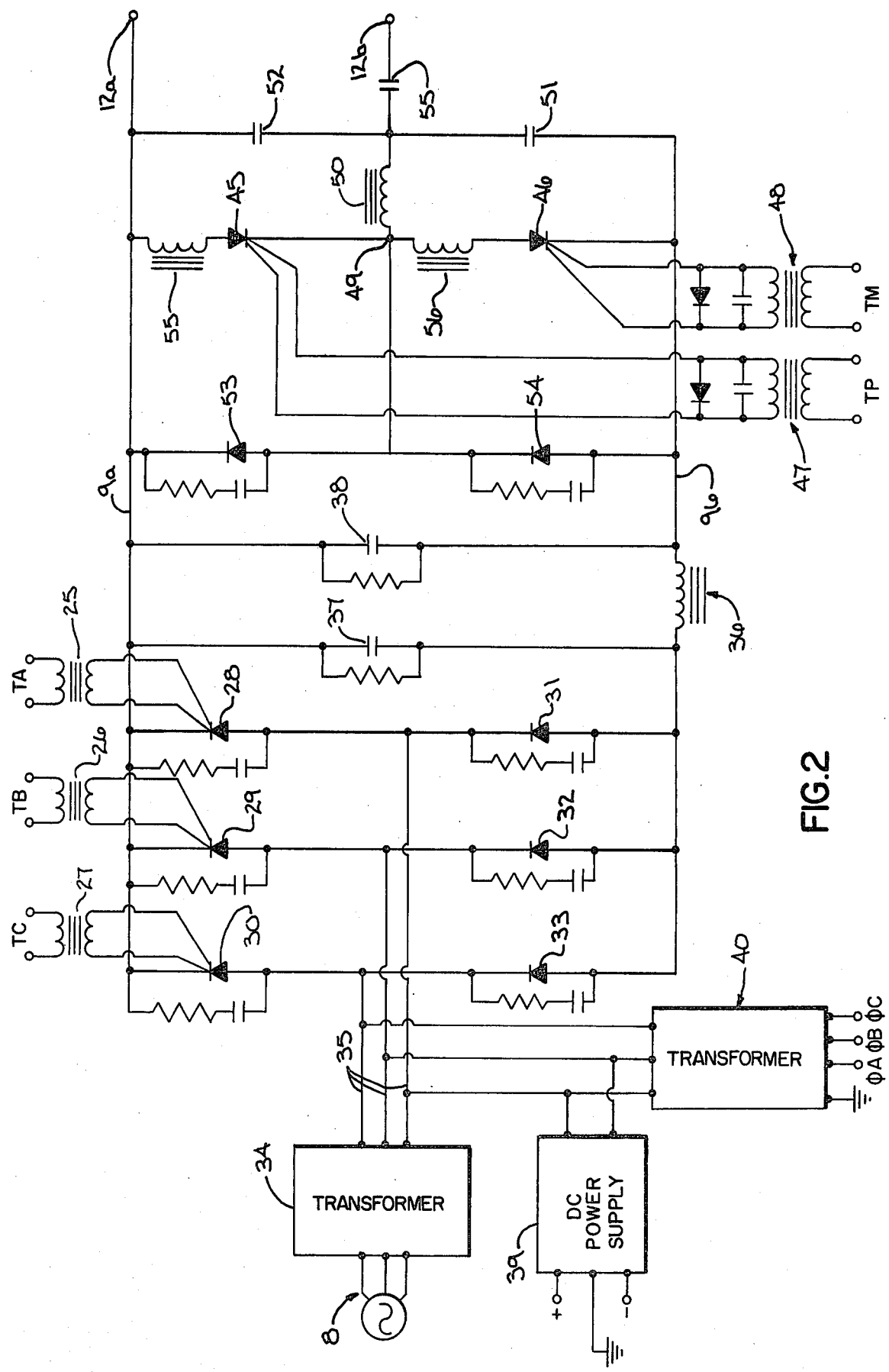
FIG. 2 is a schematic diagram of the converter circuit and the inverter circuit which form part of the power supply system of FIG. 1.

Referring particularly to FIG. 2, the converter circuit 7 is basically a three-phase full wave semi-converter in which the d.c. output voltage on bus 9 is controlled by the phase of trigger pulses TA, TB and TC applied to respective transformers 25, 26 and 27. The transformers connect to the gates on respective silicon controlled rectifiers (SCR) 28, 29 and 30 which form the upper legs of a bridge circuit. Power diodes 31, 32 and 33 connect to the SCRs 28-30 and they form the bottom legs of the bridge circuit. Three-phase a.c. power on the lines 8 is coupled to the inputs of this bridge circuit through transformer 34 and a set of input power lines 35. The junction of the upper legs forms the positive d.c. bus 9a and the junction of the lower legs is coupled through an inductor 36 to the negative d.c. bus 9b. The bridge circuit rectifies the three-phase voltage on the input lines 35 and delivers d.c. voltage on the bus 9. The magnitude of the voltage across the bus lines 9a and 9b, and hence the magnitude of the voltage delivered, is determined by the proportion of each power line cycle which is conducted by the SCRs 28-30. For example, when the SCRs 28-30 are triggered into conduction early during each cycle, a maximum d.c. output voltage is produced, whereas less d.c. output voltage is produced when the trigger pulses TA-TC are delayed.

The inductor 36 operates in combination with capacitors 37 and 38 to filter out higher frequency signals which appear on the d.c. bus 9. This filter prevents such signals from being reflected back into the input lines 35 and the power lines 8. A low voltage power supply 39 connects to the input lines 35 and it operates to provide +15 volts, 0 volts and −15 volts to the control circuits 13 and 14 and the feedback circuit 15. A transformer 40 also connects to the input lines 35 and it provides three phase reference signals A, B and C for the converter control circuit 14.

Referring still to FIG. 2, the inverter circuit 11 is a class A inverter which includes a pair of silicon controlled rectifiers 45 and 46 that connect across the d.c. bus 9a and 9b. The SCRs 45 and 46 are alternately triggered by pulses TP and TM which are applied to respective transformers 47 and 48. The junction point 49 of the SCRs 45 and 46 is thus switched between the positive d.c. bus 9a and the negative d.c. bus 9b at the frequency of the trigger pulses TP and TM. This alternating voltage is applied to a resonant circuit formed by inductor 50 and capacitors 51 and 52. This circuit is tuned to a frequency of twelve kilohertz. To prevent excessive voltage at the junction point 49 an to enable the SCRs 45 and 46 to commutate, a pair of diodes 53 and 54 are connected in parallel with the respective SCRs 45 and 46. The diode 53 enables current to flow from the junction point 49 to the positive d.c. bus 9a when the voltage at point 49 exceeds the positive d.c. voltage and the diode 54 enables current to flow from the negative d.c. bus 9b to the junction point 49 when its potential drops below the negative d.c. voltage. During such current flow the respective SCRs 45 and 46 are allowed to commutate before the other SCR is triggered into conduction. A pair of inductors 55 and 56 are connected in series with the respective SCRs 45 and 46 to limit the rate of change of voltage applied to the SCRs.

Referring particularly to FIGS. 1 and 2, the output of the inverter circuit 11 is coupled to the lines 12a and 12b through a coupling capacitor 55. The value of this capacitor 55 is selected to provide a high pass filter which presents minimal impedance to the 4 to 10 kilohertz inverter output voltage. on the other hand, the capacitor 55 buffers the inverter output from sudden changes in the load which would otherwise cause the inverter circuit 11 to momentarily deliver excessive power to the treatment process. Such a sudden change occurs, for example, when the system is started and the air in the gap between the electrode 3 and the web material 1 begins to ionize. The resulting drop in inverter load impedance occurs at a rate which is high relative to the response time of the feedback circuit 15, converter control circuit 14 and converter circuit 7. However, this change in operating conditions is relatively slow compared to the cut off frequency of the coupling capacitor 55 and it thus operates to block, or buffer, the inverter circuit 11 until the inverter circuit 11 has the time to lower the applied frequency. A momentary surge of excessive power from the inverter circuit 11 is thus avoided and the air gap smoothly changes to its ionized state without damaging arc-over between the electrodes 2 and 3. It is the combined action of the coupling capacitor 55 and the rapid response of the converter circuit 7 and inverter circuit 11 which enable the power system of the present invention to treat relatively thin web materials without the need for a dielectric layer on the metal roller 2.

Figure 3:
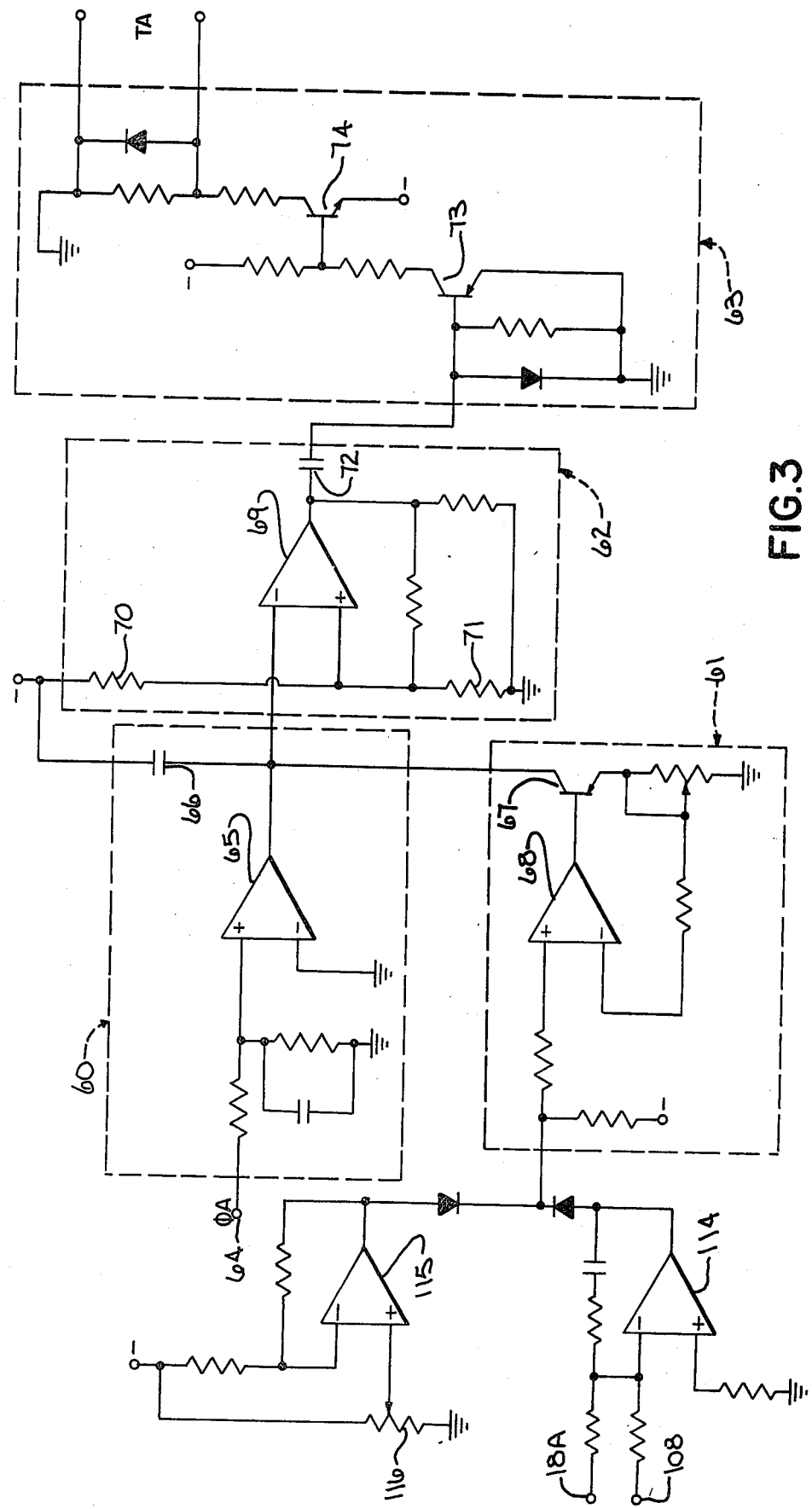
FIG. 3 is a schematic diagram of one section of the converter control circuit which forms part of the power supply system of FIG. 1.

Referring to FIGS. 1 and 3, the converter control circuit 14 is comprised of three identical firing circuits which generate the trigger signals TA, TB and TC for the converter circuit 7. One such firing circuit is shown in FIG. 3 and it includes a reference ramp generator section 60, a control section 61, a comparator section 62, and a pulse amplifier section 63. The ramp generator section 60 receives one of the power line phase signals A, B or C at an input 64 and this is applied to an operational amplifier 65 which operates open loop. The output of the amplifier 65 swings positive and negative in phase with the power line phase signal and this is applied to a charging capacitor 66 and to the input of the comparator section 62. During each negative half cycle of the amplifier output, the capacitor 66 discharges to a negative voltage at a rate determined by the current flowing through a transistor 67 in the control section 61. When this negative voltage reaches a selected level, the comparator section 62 is activated and a firing pulse is generated to the converter circuit 7.

Referring particularly to FIG. 3, the control section 61 controls the rate at which the capacitor 66 discharges and hence the phase of the firing pulses generated during each cycle of the power line voltage. The section 61 receives a signal which is formed by summing a voltage command signal and a voltage limit signal at the input of operational amplifier 68. The voltage command signal is generated by an operational amplifier 114 which receives the voltage feedback signal from the feedback circuit 15 through line 18A, and a reference signal through control line 108. When the voltage command signal increases, the output of amplifier 68 increases and the PNP transistor 67 becomes less conductive. This enables the capacitor 66 to discharge more rapidly during each power line cycle causing the converter circuit SCRs 28–30 to be triggered earlier. This results in a larger portion of each power line cycle being rectified and applied to the d.c. bus 9 causing the bus voltage to increase. The converse results when the voltage command signal 20 drops indicating that less voltage is to be delivered to the treatment process. A voltage limit signal is generated by an operational amplifier 115, and it operates to limit the maximum d.c. bus voltage. This maximum value is determined by the setting of a potentiometer 116.

Referring still to FIG. 3, the comparator section 62 of the converter control circuit 14 is comprised of another operational amplifier 69 with associated resistors connected to provide positive feedback between its output and input. When the voltage applied to its inverting input drops below the voltage established at its noninverting input by resistors 70 and 71, the output of operational amplifier 69 swings positive and a voltage pulse is coupled through a capacitor 72 to the pulse amplifier section 63.

The voltage pulse coupled to the amplifier section 63 is applied to the base of a PNP transistor 73 to momentarily turn it on. The transistor 73 shunts base current from an NPN transistor 74 to momentarily turn it off, and a positive going trigger pulse TA of 70 microseconds duration is thus generated. Similar trigger pulses TB and TC are generated by the other identical sections of the converter control circuit 14.

Figure 4:
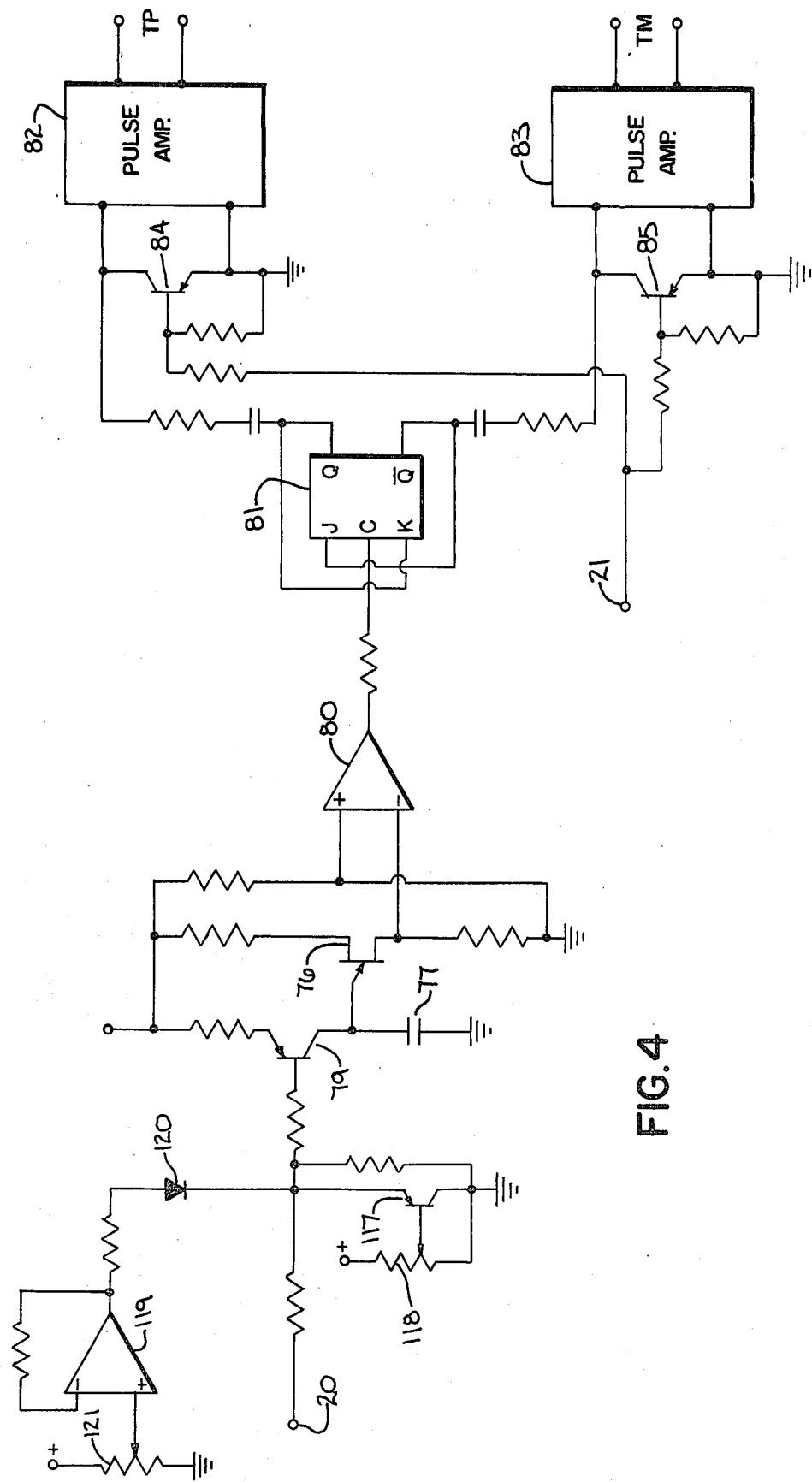
FIG. 4 is a schematic diagram of the inverter control circuit which forms part of the power supply system of FIG. 1.

Referring particularly to FIGS. 1 and 4, the inverter control circuit 13 generates the trigger pulses TP and TM for the inverter circuit SCRs 45 and 46. It includes a relaxation oscillator formed by a unijunction transistor 76, capacitor 77 and associated resistors. The frequency of this oscillator is determined by a frequency command signal on control line 20 which controls the base current to transistor 79. A minimum current is provided by a PNP transistor 117 to establish a minimum frequency under full load conditions, and an operational amplifier 119 and diode 120 limit the maximum inverter frequency under no-load conditions. Potentiometers 118 and 121 enable the minimum and maximum inverter frequencies to be manually adjusted.

The sawtooth output of the relaxation oscillator is converted to a square wave by an operational amplifier 80 and this logic level signal is applied to the clock terminal of a J-K flip-flop 81. The Q and $\bar{Q}$ outputs of the J-K flip-flop 8 are connected to its inputs such that it is toggled between its two states by the applied square wave. The Q output is capacitively coupled to a pulse amplifier 82 which generates a trigger pulse TP when the flip-flop 81 changes to one state, and its $\bar{Q}$ output is capacitively coupled to a pulse amplifier 83 which generates a trigger pulse TM when the flip-flop 81 changes to its other state. The inverter SCRs 45 and 46 are thus alternately fired at the frequency determined by the relaxation oscillator.

Referring still to FIg. 4, to protect the power supply system from excessive currents, the inputs to the pulse amplifiers 82 and 83 can be clamped to inhibit the operation of the inverter circuit 11. This is accomplished by transistor switches 84 and 85 which have their bases commonly connected to receive the current limit signal on line 21. When a current overload condition occurs, the line 21 is driven low to turn on the transistor switches 84 and 85 and to thereby shunt the firing signals applied to the pulse amplifiers 82 and 83.

Figure 5:
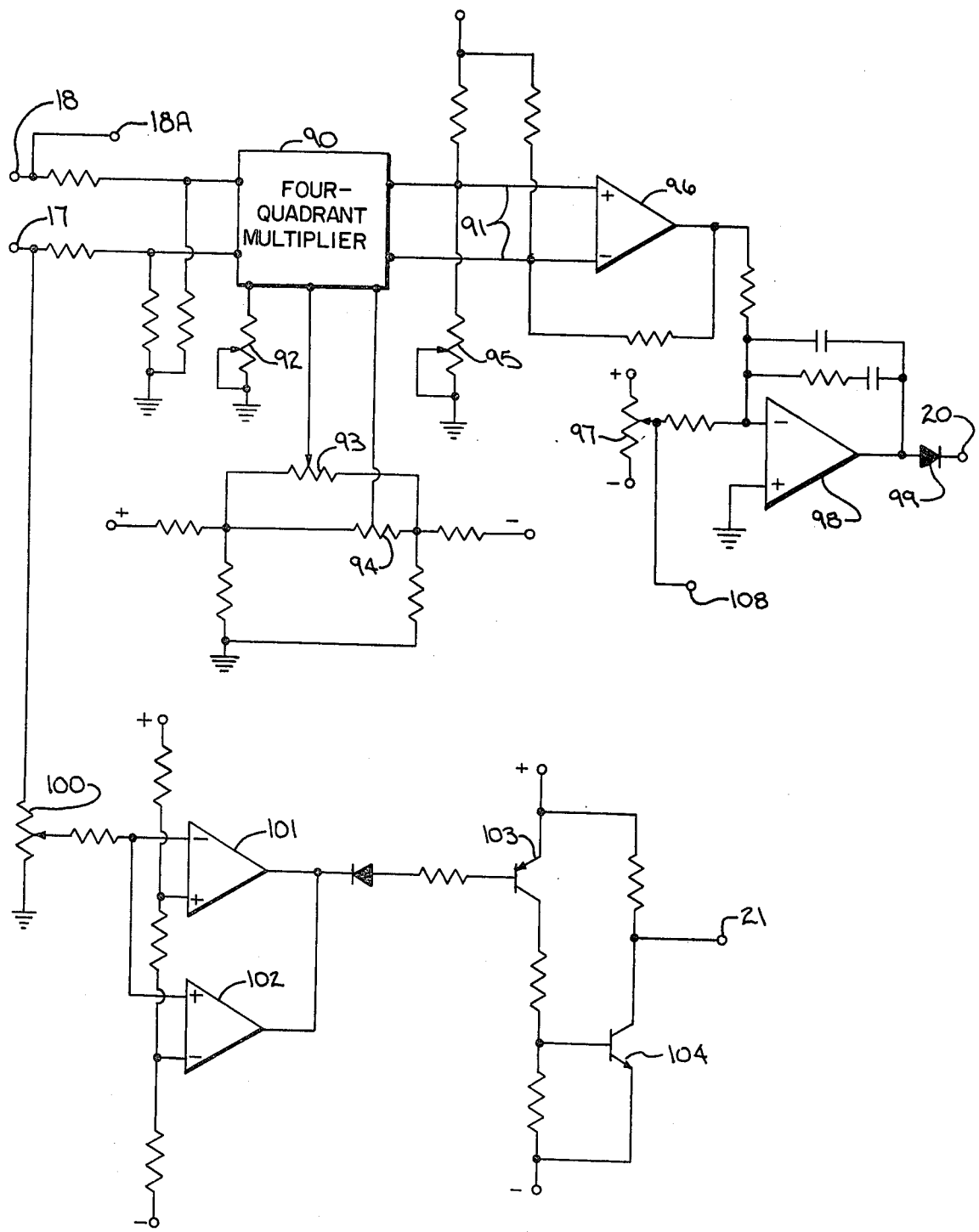
FIG. 5 is a schematic diagram of the feedback circuit which forms part of the power supply system of FIG. 1.

Referring particularly to FIGS. 1 and 5, the feedback circuit 15 receives current and voltage feedback signals and it generates the frequency command signal on line 20 and the current limit signal on line 21. Both the current and voltage feedback signals are applied to the inputs of a wideband monolithic four-quadrant multiplier circuit 90. The multiplier circuit 90 is available in integrated circuit form from a number of manufacturers. That employed in the preferred embodiment is available from Motorola, Inc. as the MC 1595L. The multiplier circuit 90 generates an analog output signal across lines 91 which has a magnitude proportional to the product of the voltage feedback signal and the current feedback signal. The multiplier circuit 90 is connected in a conventional manner recommended by the manufacturer and the associated circuitry includes a potentiometer 92 for adjusting the scale factor, a potentiometer 93 for adjusting the zero offset for the voltage feedback signal input and a potentiometer 94 for adjusting the zero offset of the current feedback signal input. A potentiometer 95 enables the zero offset of the multiplier output to be adjusted, and this output signal is applied to the input of an operational amplifier 96. The output of the amplifier 96 is a signal which is proportional to the power being delivered by the inverter circuit 11 to the high voltage transformer 5. It is summed with a reference signal generated at a potentiometer 97 which is manually set to the desired treatment power level. The resulting frequency command signal is amplified by operational amplifier 98 and coupled through a diode 99 to the control line 20. The reference signal provided by the potentiometer 97 also drives the converter control circuit 14 through the line 108. The setting of this potentiometer 97 thus establishes both the inverter operating frequency and the output voltage level under any set of operating conditions.

Referring to FIG. 5, the current feedback signal on line 17 is also applied through a potentiometer 100 to the inputs of operational amplifiers 101 and 102. Reference voltages are established at the other inputs to the operational amplifiers 101 and 102, and the voltage generated at the potentiometer 100 by the current feedback signal is compared with these references. If the current generated by the inverter circuit 11 exceeds an upper limit established by operational amplifier 101, a first switching transistor 103 is turned on and delivers base current to a second switching transistor 104. The second switching transistor 104 is driven into saturation to pull the control line 21 low, and to thus turn off the inverter circuit 11 as described above. The same result occurs when the current drops below a minimum amount as established by operational amplifier 102.

Figure 6:
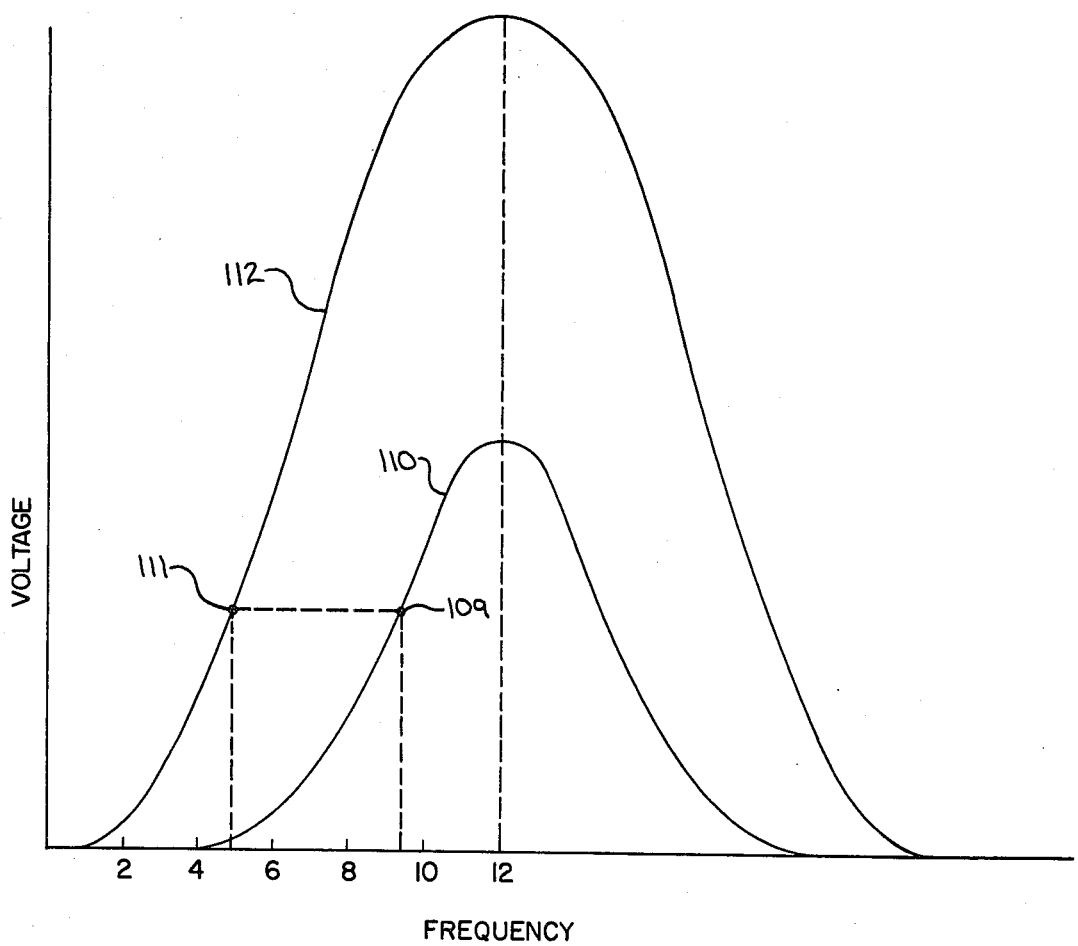
FIG. 6 is a graphic representation of system operation.

Referring particularly to FIg. 6, during start-up the power required by the treating process is minimal and the frequency is relatively high. Although the exact operating point is determined by the setting of the potentiometer 97, and the nature of the material being treated, a representative frequency and voltage during start-up is indicated by operating point 109. The shape of the voltage output curve 110 upon which the operating point 109 lies is essentially determined by the twelve kilohertz resonant circuit at the output of the inverter circuit 11. The height of this voltage output curve is primarily determined by the output voltage of the converter circuit 7. When the converter output voltage is maintained constant, the operating point 109 moves up the curve to the right when the inverter frequency is increased, and it moves down the curve to the left when the inverter frequency is lowered.

Referring particularly to FIGS. 1 and 6, when ionization occurs across the treater air gap the current, and hence the power, delivered to the treatment process rises sharply. The frequency command signal generated by the feedback circuit 15 drops as a result of this increased power demand and the inverter frequency is thus reduced. In practice, the frequency drops to an operating point within the four to six kilohertz range after ionization has occurred. Although this drop in inverter frequency would suggest a corresponding drop in output voltage along the output curve 110, this does not necessarily occur. Instead, the voltage feedback signal on line 18A which is applied to the converter control circuit 14 advances the firing of the converter circuit SCRs to increase the converter output voltage. A new operating point 111 is thus established on a much larger voltage output curve 112. The frequency is thus dropped to a range in which a much smoother and controllable corona is produced for bare roll treating without a substantial reduction in treatment voltage.

A power supply system has been described which delivers a.c. electrical power to treat relatively thin polymer materials by a corona discharge process. The power supply system controls the power delivered to the process by varying the level of the applied voltage and its frequency in rapid response to feedback signals. In addition to the relatively rapid response of the power supply system to changes in the treatment process, further control is obtained by buffering the output of the power supply system against sudden increases in power demand that occur during the ionization stage of the treatment process. This structure enables relatively thin insulating web materials to be treated without the need of added layers of dielectric materials required by prior systems.

We claim:

1. A power supply for a corona treatment system in which the material to be treated is disposed between two metallic electrodes, the combination comprising:

a converter circuit for converting an a.c. input voltage into a d.c. output, the converter being responsive to a voltage feedback signal to control the magnitude of the d.c. output;

an inverter circuit coupled to receive the output of the converter circuit and being operable to generate an a.c. output voltage which is applied across the two metallic electrodes of the corona treatment system, the frequency of which is determined by a frequency feedback signal; and a feedback circuit coupled to the inverter circuit and connected to receive feedback signals which indicate the voltage and current supplied to the corona treatment system and being operable in response thereto to generate a voltage feedback signal to the converter circuit and a frequency feedback signal to the inverter circuit which alters the operating conditions of the corona treatment process when ionization occurs between the two metallic electrodes to prevent arc-over therebetween.

2. The power supply as recited in claim 1 in which the frequency of the inverter output voltage is reduced by the feedback circuit and the a.c. output voltage of the inverter circuit is maintained relatively constant by the feedback circuit when ionization occurs between the two metallic electrodes.

3. The power supply as recited in claim 1 in which the feedback circuit includes a multiplier which generates a frequency feedback signal proportional to the power supplied to the corona treatment process and in which the frequency of the inverter a.c. output voltage is reduced in resoponse to this frequency feedback signal when ionization occurs between the two metallic electrodes.

4. The power supply as recited in claim 1 in which the a.c. output voltage generated by the inverter circuit is coupled to the two metallic electrodes through a capacitor which presents a low impedance to the a.c. output voltage, but which buffers the inverter output from sudden changes in power required by the corona produced between the two metallic electrodes.

* * * * *